United States Patent [19]

Strauss

[11] 4,243,529
[45] Jan. 6, 1981

[54] OIL COLLECTING APPARATUS
[75] Inventor: William A. Strauss, Mason, N.H.
[73] Assignee: Oil Recovery Systems, Inc., Greenville, N.H.
[21] Appl. No.: 3,597
[22] Filed: Jan. 15, 1979

Related U.S. Application Data
[63] Continuation-in-part of Ser. No. 659,421, Feb. 9, 1976, abandoned.

[51] Int. Cl.³ .......................................... E02B 15/04
[52] U.S. Cl. ................................ 210/109; 210/242.1; 210/923
[58] Field of Search ................. 210/83, 242, DIG. 25, 210/DIG. 26, DIG. 5, 109

[56] References Cited
U.S. PATENT DOCUMENTS

| 882,030 | 3/1908 | Traulson et al. | 210/242 R |
|---|---|---|---|
| 3,115,459 | 12/1963 | Giesse | 210/DIG. 5 |
| 3,187,895 | 6/1965 | Pall et al. | 210/DIG. 5 |
| 3,537,587 | 11/1970 | Kain | 210/242 S |
| 3,617,548 | 11/1971 | Willihngenz | 210/DIG. 5 |
| 3,701,429 | 10/1972 | Schell | 210/242 S |
| 3,722,688 | 3/1973 | Wiwchiy | 210/242 S |
| 3,722,689 | 3/1973 | Markel et al. | 210/242 S |
| 3,745,115 | 7/1973 | Olsen | 210/242 S |
| 3,764,527 | 10/1973 | Sohl | 210/DIG. 26 |
| 3,779,382 | 12/1973 | Staltner | 210/242 |
| 3,792,979 | 2/1974 | Clinton | 210/242 |
| 3,794,175 | 2/1974 | Stewart | 210/242 |
| 3,831,756 | 8/1974 | Bhura et al. | 210/DIG. 25 |
| 3,948,768 | 4/1976 | Chapman | 210/DIG. 5 |
| 4,024,063 | 5/1977 | Moli | 210/242 R |
| 4,053,414 | 10/1977 | Veld | 210/DIG. 5 |
| 4,105,557 | 8/1978 | Weatherhole | 210/242 R |
| 4,111,809 | 9/1978 | Pichon | 210/242 R |
| 4,154,678 | 5/1979 | Kole | 210/242 R |

Primary Examiner—Theodore A. Granger

[57] ABSTRACT

An oil collection system comprising a two-part housing defining an interior cavity and an annular opening in the side thereof to permit flow of oil into the cavity, a pleated or variable pore size hydrophobic-oleophilic screen mounted in the opening to permit passage of oil but not of water therethrough, an outlet passage extending from the bottom of the cavity through the housing and adapted for connection to an outlet hose and pump, a pump controller mounted within the housing and including a float having a magnet in the bottom thereof and a soft magnetic element in the cavity bottom adjacent the float, and a chlorinator for preventing biological growth on the screen. A draw bolt holding the base and cover together, about the annular screen, also forms a guide shaft for the pump-actuating control float. As the pump controller requires the unit to fill before activating the pump a progressive sinking of the unit occurs during a pumping cycle, a movement which is enhanced by the limitation to buoyancy provided by the block-form floats shown. The oil collection capability of this unit in the presence of thin oil films in enhanced by this accentuated sinking movement.

4 Claims, 8 Drawing Figures

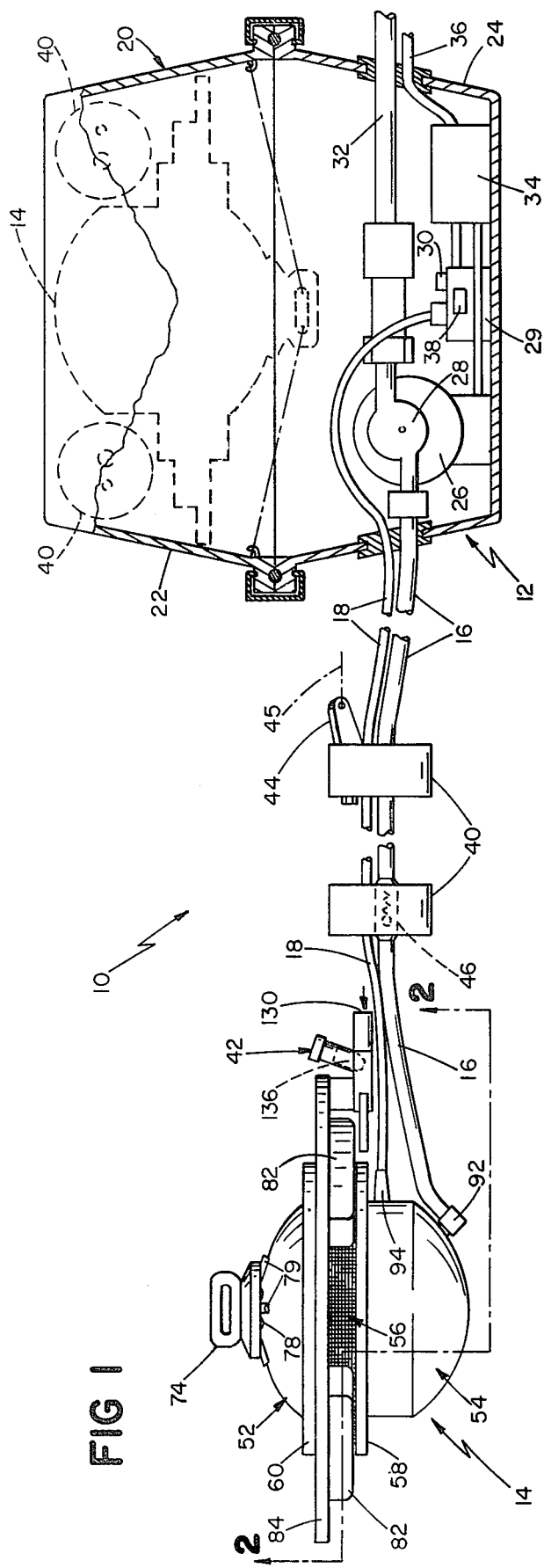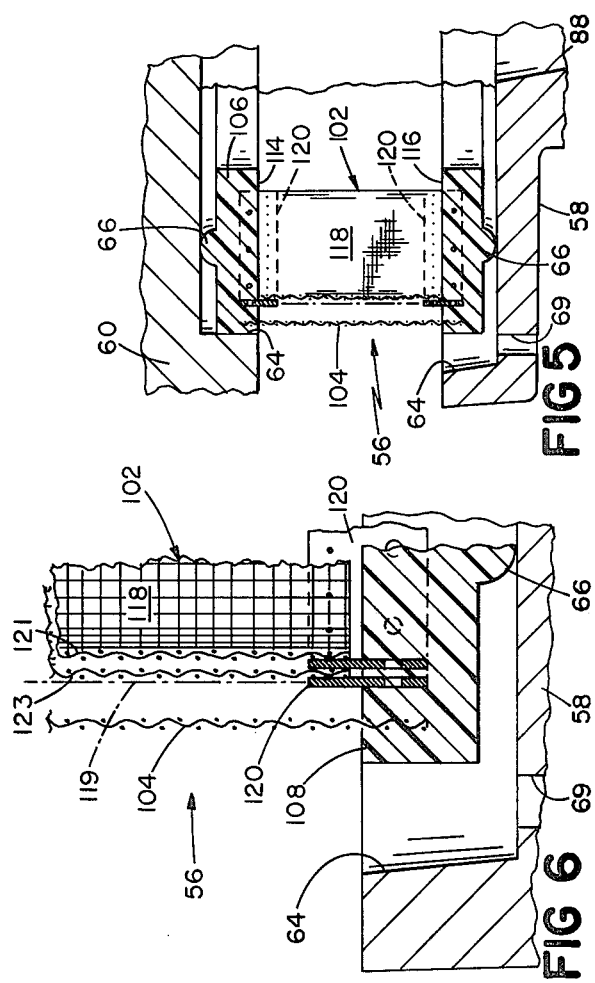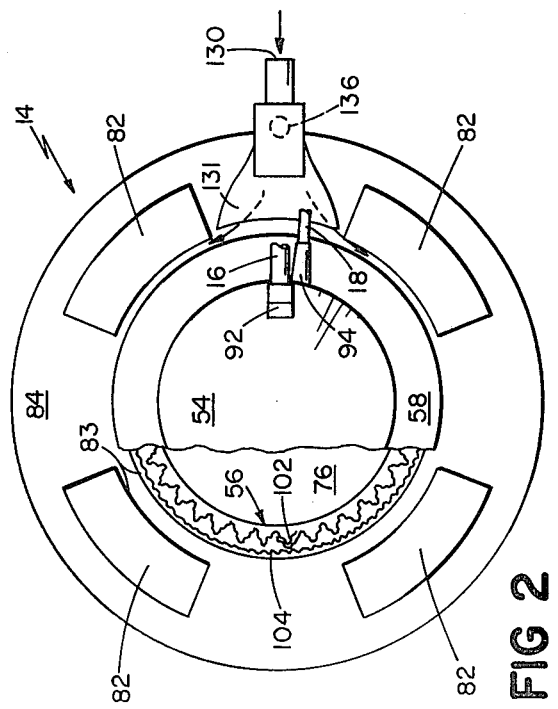

OIL COLLECTING APPARATUS

This invention relates to oil collection systems and, more particularly, to systems for recovering floating spills and accumulations of diesel and heating fuel, gasoline, kerosene, and other oils. This application is a continuation-in-part of copending application Ser. No. 659,421, filed Feb. 19, 1976 now abandoned.

In the recent past, several types of systems for dealing with unwanted oil slicks and accumulations have been proposed. One such system includes a floating oil collector comprising a two-part housing defining an interior cavity and an annular cartridge including a hydrophobic oleophilic screen mounted between the housing sections to permit oil to flow into the cavity. An outlet hose extends from the collector to a cabinet including a pump and power supply, and the pump is controlled by a float switch in the housing and a time delay mechanism in a control circuit.

According to the present invention, it is realized that practical operating difficulties of such systems are traceable to the fact that desirable hydrophobic oleophilic materials are difficult to seal and may pass water if contacted by any foreign material. It is also realized that the collection rate and useful life of the hydrophobic oleophilic elements must be increased, and the cost of the electric controls reduced.

It is a principal object of the present invention to provide an automatic, efficient, self-contained system for relatively rapid recovery of an essentially water-free product from thick and thin oil slicks. Other objects include providing such systems in which the collection unit includes an improved hydrophobic oleophilic screen, a simplified control preventing accidental and too rapid cycling of the pumping mechanism, and means for preventing biological growth on the screen.

The invention features, in an oil collection system including a buoyant collection unit comprising a housing defining an interior cavity and having an annular opening in the side thereof, and a generally annular hydrophobic oleophilic filter mounted in the opening to permit oil but not water to flow into the cavity, the filter comprising a pair of spaced seal rings and a generally annular screen coated with a hydrophobic oleophilic material supported between the seal rings, that improvement wherein end portions of the coated screen are overlapped in face-to-face engagement without adhesive and thereby form a water-tight seal between the engaged portions. In a second aspect, there is featured a controller comprising a float mounted in a cavity for movement in a generally vertical direction between a first configuration in which it rests on the bottom of the cavity and a second configuration in which it is spaced from the cavity bottom, a magnet mounted in one of the cavity bottom and float, and a soft magnetic element mounted in the other of the cavity bottom and float, and magnet and the element being closely adjacent each other when the float rests on the cavity bottom whereby the magnet prevents the float from moving to its second configuration unless the cavity contains fluid to a depth substantially in excess of that required buoyantly to support the float. Further aspects feature a buoyant oil collection unit including flotation arranged such that the unit will float with the lower edge of the hydrophobic oleophilic screen never more than about ¼ to ½ in. below the water surface; in which the pores in the screen are of greater size adjacent the top of the screen than adjacent the screen bottom; and which supports means for supplying a biological growth inhibitor to the hydrophobic oleophilic filter of the collection unit. Preferred embodiments, which may include all aspects, further feature, flotation blocks mounted on the housing cover radially outwardly of the coated screen and projecting downwardly from the cover, a magnetic reed switch or air pressure switch operated by the magnetic control, a protective barrier screen of the desired mesh positioned radially outwardly of the coated screen and flotation blocks, and a chlorinator for introducing a continuous flow of chlorinated vapor into the cavity interior.

The unit here shown has the unique feature of enhancing its own collection capability in the presence of thin oil slicks, through the progressive (though slight) sinking action it undergoes as it fills between the pump cycles. Both the limit to the buoyant effect contributed by the block-form floats, and the hysteresis provided by the preferred magnetically retarded level-sensitive control serve to enhance this effect.

Other objects, features and advantages will appear from the following detailed description of a preferred embodiment of the invention, taken together with the attached drawings in which:

FIG. 1 is a plan side view, partially in section, of a system embodying the present invention;

FIG. 2 is a bottom plan view, partially in section, of the floating collection unit of the system of FIG. 1;

FIGS. 5–7 are sectional views of the oil/water separator cartridge of the system of FIG. 1; and, FIG. 8 is a sectional view of a modified collection unit.

Figure 3:
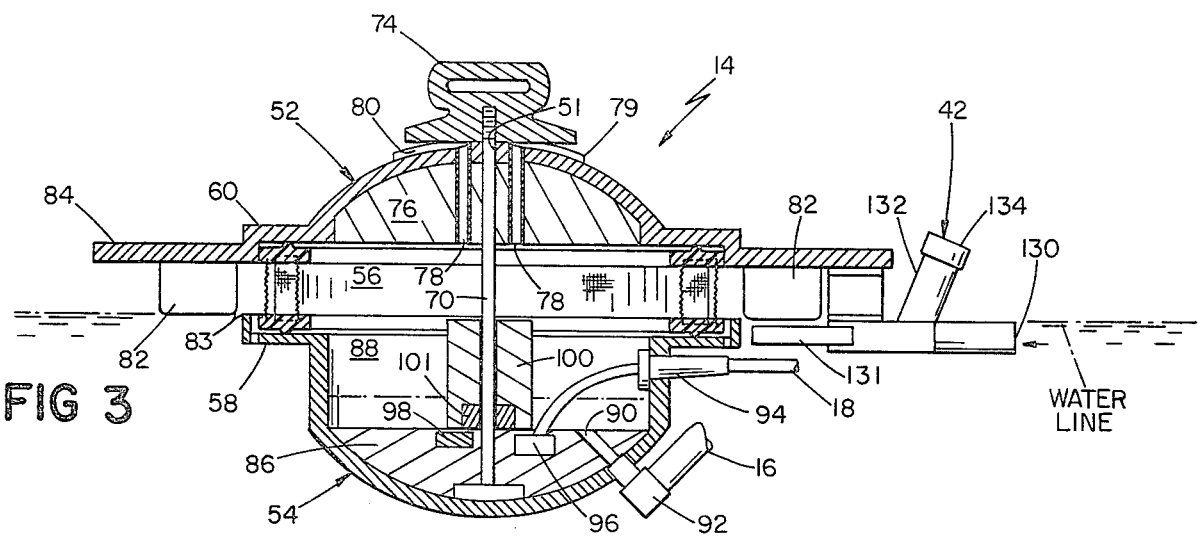
FIGS. 3 and 4 are sectional side views of the floating collection unit of the system of FIG. 1.
Figure 4:
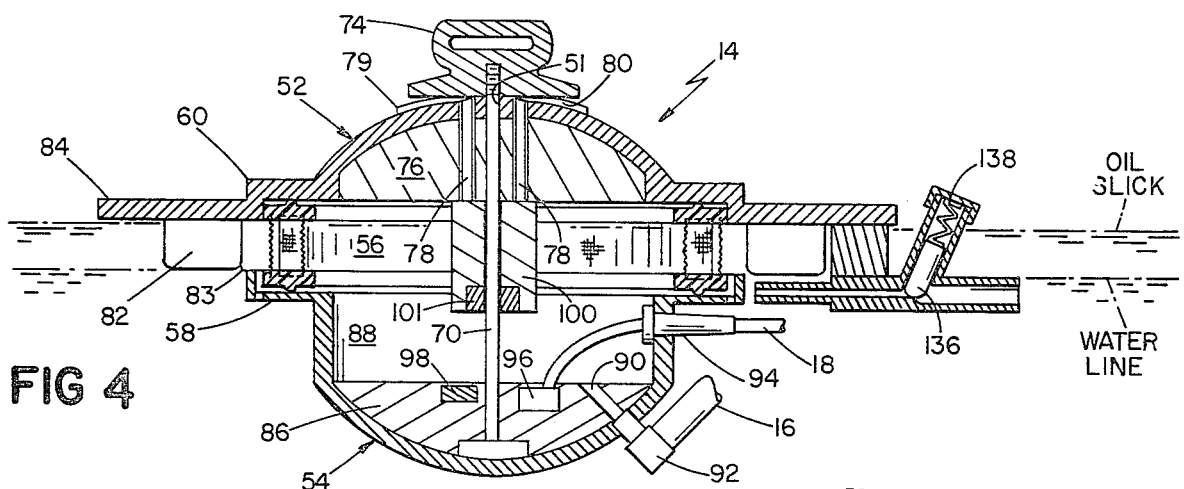

Referring more particularly to FIGS. 1–7 of the drawings, there is shown an oil collecting system, generally designated 10, comprising a control and pumping unit 12 connected to a floating oil collection unit 14 by an oil delivery hose 16 and a control cable 18.

As shown, the control and pumping unit 12 is enclosed in a generally cubical, portable, waterproof case 20. The size of the case is such that, as shown by the dotted lines, oil collection unit 14 may be stored in the top 22 of the case when the system is not in use. The system's pumping and control system is mounted in the bottom 24 of the case and, as shown, includes a motor 26 driving a helical gear transfer pump 28, a control box 29 into which cable 18 is plugged, and an explosion proof enclosure 34 containing the pump control circuitry. As shown the inlet of pump 28 is connected to hose 16; and its outlet is connected to an outlet hose 32 which, in turn, is adapted for connection to a collection reservoir (not shown). Enclosure 34 is connected to motor 26 and, by cable 36, to a source of power (not shown). A pump reversing switch 38 and an override switch 30 are provided on control box 29.

A plurality of urethane floats 40 are spaced at intervals along and support hose 16 and cable 18. A check valve 46 is mounted in hose 16 adjacent the float 40 nearest collection unit 14. The next float, about 4 feet from unit 14, includes an eye 44 for connection to a mooring line 45.

Oil collection unit 14 comprises a domed cover 52, a hollow base 54, and an annular oil/water separating cartridge 56 mounted between a pair of annular flanges 58, 60 projecting radially outwardly from the base and cover respectively. As shown, each of flanges 58, 60 includes a circumferential outer lip 64 (about ⅜" high). Cartridge 56 fits within the flange lip, with a sealing ring 66 on the upper and lower surfaces providing an "O" ring type seal against the flat mating surfaces. Drainage holes 69 extend through flange 58 between cartridge 56 and lip 64. The unit is held together by a central bolt 70 extending the full height of the unit, from the bottom of base 54 upwardly through a center hole 51 in cover 52. A handle 74 is screwed onto the top end of the bolt, bears against ridges 79 on the outside of cover 52 extending radially from hole 51, and draws cover 52 and base 54 towards each other with flanges 58, 60 compressively engaging cartridge 56.

The inside of cover 52 above the top of cartridge 56 is filled with positive flotation 76, typically a closed cell urethane foam. Six air passages 78, each about ¼" in diameter and spaced at 60° intervals, extend from the bottom of flotation 76 upwardly through the top of the cover. As shown, the diameter of handle 74 is such that the bottom of the handle projects radially beyond air passages 78. Because of the curvature of cover 54 and radial ridges 79, there is a slight gap 80 between the handle bottom and the ends of the air passages. Four flotation blocks 82, each comprising an annular segment of a closed cell urethane foam to prevent degradation by gasoline and other oils, are mounted on the underside of an annular disc 84 projecting radially outwardly from flange 60. As shown, the vertical thickness of each of blocks 82 is such that the bottom of the block is flush with or slightly above the top of lip 64 of base 54. The inner edge of each block 82 is spaced radially outward from lips 64 of flange 58 to provide a flow gap 83 at least one inch wide therebetween. A chlorinator, generally designated 42, is mounted on the underside of disc 84 between a pair of blocks 82.

The bottom of base 54 is filled with ballast 86 comprising lead shot potted in epoxy. The portion of the base above ballast 86 defines an oil collection cavity 88 having a volume of about one-half liter. An outlet duct 90 extends from the bottom of cavity 88 (defined by the top of ballast 88) diagonally through the ballast to a fitting 92 on the outside of the domed bottom of base 54. Oil hose 16 is connected to fitting 92. Control cable 18 extends through a watertight fitting 94 in the side of base 54 to a magnetic reed switch 96 embedded in the top of ballast 86 adjacent bolt 70. Fittings 92 and 94, and chlorinator 42 on cover 52, are generally vertically aligned on the upstream side of unit 14. A plate 98 of soft magnetic material is embedded in the top of ballast 86 (and covered by a thin sealing layer) on the side of bolt 70 opposite reed switch 96. A cylindrical float 100 of urethane foam is mounted coaxially on bolt 70 for movement between a first position (FIG. 3) in which the float sits on top of ballast 88 and a second position (FIG. 4) in which the float is spaced above ballast 88 with the top of the float abutting flotation 76 in cover 52. A permanent ring magnet 101 is embedded in the bottom of float 100 and covered by a thin sealing layer reed switch 96, which is biased towards its closed position, is held open by magnet 101 when float 100 is in its first (FIG. 3) position, and is closed by its own bias when the float rises to its second (FIG. 4) position. In some embodiments a double throw reed switch is employed to actuate a signal light when float 100 is in its first (FIG. 3) position.

Referring now to FIGS. 2 and 5 through 7, cartridge 56 comprises an hydrophobic-oleophilic screen 102 and a surrounding protective barrier screen 104 mounted between a pair of coaxial, spaced, annular seals 106, 108 of urethane or plastisol. The inner and outer diameters of each of seals 106, 108 are about 7¼ in. and 9½ in., respectively; the overall height of each seal (not including ⅛ in. high ring 68) is about ¼ in.; and the vertical distance between the adjacent facing surfaces 114, 116 of the two seals is about 1¼ in. Protective barrier 104 is about 1½ in. high and 9¼ in. in diameter, and extends vertically between seals 106, 108 with the ⅛ in. at its upper and lower edges embedded in and adhesively secured to the outer peripheral portion of the seals. In the embodiment shown, barrier 104 is monel or stainless steel 100 mesh (0.005 in. holes and 0.005 in. wires) and prevents any particulate material from reaching filter 102. In other embodiments, where it is desired only to protect filter 102 from larger floating bodies, a larger mesh (e.g., ⅛ in.) may be used.

Screen 102 comprises a monomesh web 118 (square weave of monel or stainless steel, 100 mesh), a stainless steel strip 120 welded along each of the top and bottom edges of the web, and a coating 119 of thermoplastic polytetrafluroethylene or FEP covering the entire portion of the web between strips 120. As shown, each strip 120 is about ¼" high and is perforated along a line adjacent the edge thereof spaced from web 118. One half of each strip 120, including the perforations 125, is embedded in a respective one of seals 106, 108 to a depth of about ⅛"; the other half of each strip overlies and is welded to the adjacent edge of web 118. In practice screen 102 is constructed by coating the entire portion of the web between strips 120 after the strips have been welded to the web and then pleating the screen into the configuration shown in FIGS. 2, 6, and 7. The height of the coated web is about one inch and its total surface area is about 60 sq. in.

Figure 7:
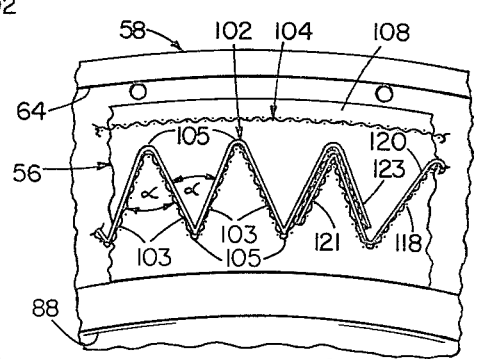

The pleated configuration of screen 102 is shown most clearly in FIGS. 2 and 7. The length of the screen portions 103 between successive folds 105 is about one inch, and the included angle, $\alpha$, between each pair of adjacent portions 103 is about 45°. The flow rate through the screen significantly decreases when this included angle is made too small, generally less than about 15°. When the angle becomes too small, the surface tension of the viscous oil retards flow between folds and minisci bridge the gap between the closely adjacent screen portions 102, and little or no oil passes through the portions of the screen between each meniscus and the included fold 105. The exact included angle, $\alpha$, at which flow through the screen is significantly reduced depends on the viscosity of the particular oil. The flow rate is nearly always significantly decreased if the included angle between adjacent folds is less than 15°; to permit the collection unit to work efficiently with a broad range of oils, the angle preferably should not be less than about 30°.

As shown in FIGS. 6 and 7, screen 102 is formed into a continuous annulus by overlapping its ends 121, 123. Typically, each overlapped end is about 2 in. long and includes a complete pleat (two screen portions 103 and an included fold 105), and two ends are nested together in close face-to-face engagement. The hydrophobic oleophilic capillary gap between the juxtaposed ends provides a seal preventing the passage of water, even though no adhesive is used. Alternatively, the gap may be decreased by folding the screen back upon itself, thereby eliminating a strip 120 between the overlapped screen portions. To prevent water leakage through the coated web 118, it is important that there be a gap between the coating and any adhesive used to secure the embedded strips 120 to seal rings 106, 108, and that there also be a gap between screen 102 and barrier 104.

Chlorinator 42 comprises a water flow tube 130 open at both ends and projecting radially of unit 14, and a side tube 132 projecting angularly outwardly from tube 130. The end of tube 130 nearer unit 14 forms a flared nozzle 131 and is attached to the underside of disc 84 between a pair of blocks 82. The outer end of side tube 132 is closed by an end cap 134. A solid chlorine pellet 136 is mounted in side tube 132 and forced towards and partially into flow tube 130 by spring 138. As will be evident, water flow through tube 130 will dissolve chlorine from pellet 136 and discharge chlorine into the water (concentration about 1 ppm) closely adjacent and on the upstream (windward) side of filter 102.

In operation, pump and control unit 12 is connected to a source of power and to a collection tank or other reservoir, and oil collection unit 14 is placed in the sump, pond, harbor or the like from which oil is to be recovered. The system is designed so that control unit 12 may be up to 15 feet away from, and up to 10 feet above, collection unit 14. In a large body of water, collection unit 14 is held in place by mooring lines 45 connected to eye 44 on hose-cable float 40. As will be evident, unit 14 will float to leeward (or downstream) and chlorinator 42 will provide for a constant flow of treated, biological growth-inhibiting water past the hydrophobic oleophilic filter.

The size, flotation and ballast of unit 14 are such that, when interior cavity 88 is empty, the unit will float in water with the bottom of flotation blocks 82 at or just below the waterline, and the lower edge of the coated portion of screen 102 approximately $\frac{1}{8}''$ to $\frac{1}{4}''$ below the waterline (FIG. 3). If oil is present on the surface, it will flow through screen 102 into cavity 88 in unit base 54. The hydrophobic oleophilic properties of screen 102 are such that the oil flowing into cavity 88 is about 99.5% waterfree. The rate of flow depends on the particular oil. Tests have shown, for example, that flow rates of 5 gallons per minute (the capacity of pump 28) into the cavity will result when unit 14 is in a 0.75" thick slick of gasoline, a 1.05" thick slick of kerosene, or a 1.25" thick slick of #2 fuel oil.

When the slick is sufficiently thick to produce a flow rate of 5 gpm, cavity 88 will fill and the pump will run continuously. With cavity 88 full, unit 14 is heavier, and sinks and pulls flotation blocks 82 down into oil slick. The size of blocks 82 is such that, when cavity 88 is full of oil, unit 14 will float (FIG. 4) with the lower edge of coated web 118 about $\frac{1}{4}''$ below the waterline. Most of the web will be below the top of the oil slick; and, if the slick is more than an inch thick, disc 84 and flange 60 may be totally submerged. In this situation, flotation 76 in cover 52 prevents the unit from sinking. Regardless of the thickness of the slick, the unit will always float so that no portion of the coated web is more than about $\frac{1}{4}$ to $\frac{1}{2}$ inch underwater.

Magnet 101 and plate 98 are very close to each other when float 100 is resting on top of ballast 86, and the attractive force between magnet 102 and plate 98 holds the float down on the ballast until cavity 88 is substantially full of oil. When the cavity has filled, float 100 breaks loose and floats up on bolt 70 until the top of the float abuts cover flotation 72, releasing reed switch 96 and permitting it to close. Float 100 remains spaced away from ballast 86, and reed switch 96 remains closed, until about two-thirds of the oil has been pumped from cavity 88. Thus, as should be evident, metal plate 98 introduces a "hysteresis" into the operation of float 100 and reed switch 96, insuring that the switch does not close until a large amount of oil has collected in cavity 88, but insuring that the switch remains open until the cavity has been pumped about two-thirds dry.

Typically, the control circuitry in enclosure 34 is connected to a 115 volt power source, and enclosure 34 thus must be explosion proof. To permit cable 18 to be connected using non-explosion proof connectors, and to permit use of a non-explosion proof override switch 30, the signal current supplied to non-explosion proof control box 29 and, thence, to unit 14 and reed switch 96 is reduced to 6 volt, 1 milliampere. The control circuit in enclosure 34 is arranged to actuate pump motor 28 when the signal circuit is closed, either by the lifting of float 100 or, for test purposes or when used separately as a transfer pump by manual actuation of override switch 30 on control box 29. The pump remains on until, as appropriate, switch 30 is released or float 100 drops back down onto ballast 86. In normal operation, pump motor 28 will cycle on and off if the rate of oil flow through screen 102 is less than the 5 gpm capacity of pump 28, and will run constantly if the oil flow rate is equal to or greater than 5 gpm.

To purge screen 102 it may, on occasion, be desirable to back-flush oil through the system by forcing oil into cavity 88, and thence outwardly through the screen. This may be accomplished by throwing pump reverse switch 38 and then pressing override switch 30, or by automatic cycling of the pump as a function of time or volume of use. To permit such back-flushing, it is of course necessary to disable or by-pass check valve 46.

Figure 8:
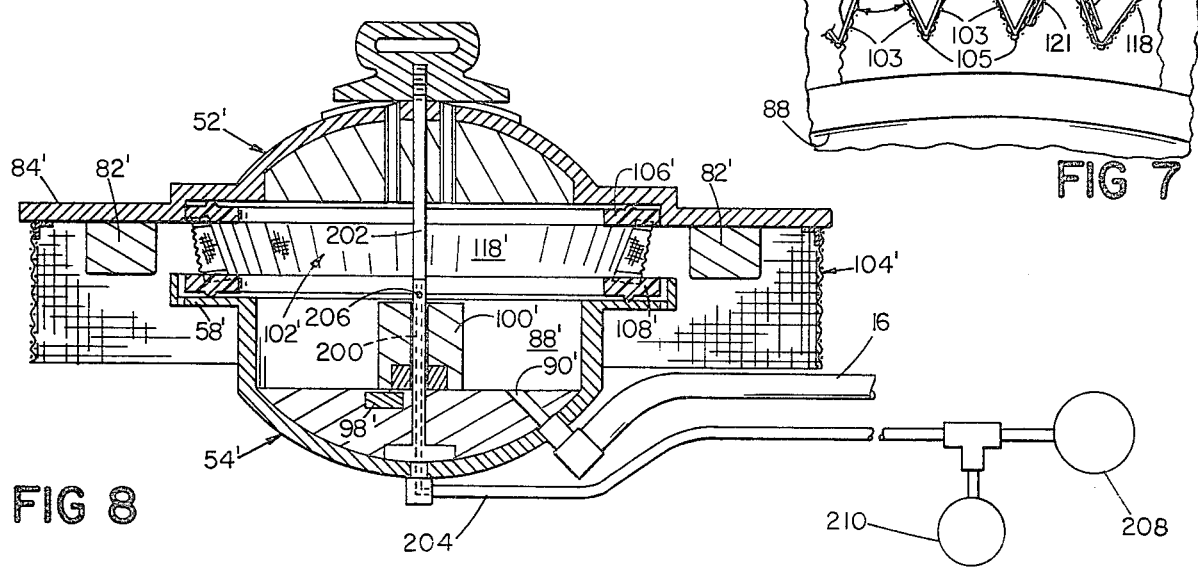

Under some circumstances, it may be desirable to substitute an air control system for the control cable/reed switch system of the embodiment just described. Such a modified system is shown in FIG. 8. Many parts of the FIG. 8 system are substantially identical to corresponding parts of the system already described, and are identified by the same reference numerals with a differentiating prime (') added thereto. As illustrated in FIG. 8, a hollow tube 200 extends coaxially up from the bottom of base 54' and is welded to the lower end of a coaxial bolt 202. Together, tube 200 and bolt 202 hold the housing parts together as did bolt 70 in the embodiment previously described. Float 100' is mounted coaxially on hollow tube 200. The bottom of tube 200 is connected to a 5/32" flexible tube 204 extending, along oil hose 16', to an air source 208 in control unit 12'. A bleed hole 206 is provided in the side of tube 200 just above the top of float 100. When cavity 88' fills, float 100' rises and blocks bleed hole 206. A sensor in the control unit 12' continuously senses the back pressure in tube 204. When as a result of hole 206 being blocked, the pressure rises, pump motor 26' is activated. The pump remains running until cavity 88' has emptied, float 100' is again resting on ballast 86', and bleed hole 206 is unobstructed. Among the advantages of this air control type of system is that a nebulizer 210 may be connected to tube 204 downstream of air source 208. Chlorine (in gas or liquid form, typically a sodium or calicum hypochlorite) from nebulizer 210 mixes with air from source 208, resulting in a dilute chlorine gas continuously being introduced into the interior of unit 14 and making the use of an external chlorinator 42 unnecessary.

Control unit 14' includes also a modified hydrophobic oleophilic screen 102' and barrier screen 104'. As shown, barrier screen 104' is mounted on the underside of disc 84' spaced radially outward of flotation blocks 82', and depends downwardly to a plane an inch or so below flange 58'. The surface area of barrier 104' is far greater than that of barrier 104 of unit 14, and the flow rate therethrough is less likely to be reduced by debris building up on the barrier.

Hydrophobic oleophilic screen 102' is in the form of an inverted, pleated conical frustrum. The holes in the web 118' of screen 102' are not of uniform size, but vary more or less exponentially according to the inverse of the distance from the particular hole to the top of the screen. The one-inch high screen web 118 comprises four vertically-spaced annular bands, each ¼" wide. The holes in the bottom band, adjacent the bottom of the screen and seal ring 108, each have a major dimension (diagonal if square, radius if round) of 0.005 in. The holes in the top band, adjacent the top of the screen and seal ring 106, each have a major dimension of 0.02 in. The holes in the upper and lower intermediate bands have major dimensions of, respectively, 0.01 in. and 0.0067 in. The ability of coated webs such as webs 102 and 102' to prevent passage of water through the pores in the web depends on the major dimension of each pore and the head of water to which it is subjected, the greater the pressure head, the smaller pore required to prevent waterflow. The volume of oil flow through any particular pore, however, varies according to the square of the pore area. Thus, it will be apparent that screen 102' will pass a far greater volume of oil (per unit area of coated web) than will screen 102; but that it will be just as effective in preventing passage of water therethrough. It should be noted that screens having pores of varying sizes, such as screen 102' are especially useful in oil collection units used in calm water. In rough water, the unit may be tossed about, or be subjected to such heavy spray, that the larger pores will be subjected to too large a water pressure head. In calm water, flotation blocks 82 and interior flotation 76 insure that the water head does not exceed the critical level.

The oil collector just described has a unique advantage when applied to very thin oil slicks, e.g., 0.1 inch thick, as are often encountered. One might think that the hysteresis feature (which requires a large amount of oil to be collected before pump operation) and the float arrangement (which, because of the limited number and block-form of the floats allows the unit to sink as oil is collected) would be detrimental in the case of such thin oil slicks. On the contrary, in the presence of a thin slick, e.g., 0.1 inch, the motion of the screen (small overall, but large in comparison to the thickness of thin films) effectively increases the collection rate. This occurs because the oil-wetted area of screen through which the oil flows is increased by the movement as if the unit were immersed in a much thicker oil slick. What happens is that as the oil enters the unit and sinking occurs, the lowest portion of the screen originally wetted by oil is drawn down, as if to pass below the water line (the line separating oil and water). But due to the oleophilic adhesion between screen and oil, the exterior of this portion of the screen remains coated with oil, effectively creating a slightly depressed "pool" of oil around the screen. Oil at the surface tends to flow into this pool, replenishing that oil which enters the screen thus sinking of the unit increases the collection capacity in the presence of such thin slicks. An increase in collection of as much as three times, compared to collection in the absence of such controlled sinking, can readily be observed in the case of films 0.1 inch and can also be shown through calculations.

Other embodiments will be within the scope of the following claims.

What is claimed is:

1. In an oil collection system including a buoyant collection unit comprising
   a housing defining an interior cavity and having an annular opening in the side thereof to permit flow of oil into said cavity, and
   a hydrophobic oleophilic filter mounted at said opening to permit oil but not water to flow therethrough into said cavity,
   said filter comprising a pair of spaced seal rings and a generally annular screen coated with a hydrophobic oleophilic material supported between said seal rings, said housing comprising a top cover and a base held respectively against said spaced seal rings,
   and an annular array of floats carried by said housing, that improvement wherein
   a draw bolt extending centrally between said cover and base draws said cover and base together about said sealing rings and screen to form said housing,
   said central bolt also serves as a guide shaft for a control float of a pump of said system,
   said control float carrying a switch-actuating magnet,
   and said control float slideably engaged upon said bolt to move therealong between lower, pump de-actuating and upper, pump actuating positions in response to the level of oil collected in the volume of said buoyant housing.

2. The oil collection system of claim 1 wherein said annular screen is formed by a length of screen material having folded portion that define pleats, the ends of said screen material overlapping face-to-face to form an effective hydrophobic oleophilic seal.

3. The oil collection system of claim 1 wherein said annular array of floats is disposed below and joined directly to said cover,
   said cover extending annularly outwardly beyond said floats to provide protection therefor.

4. In an oil collection system including a buoyant collection unit comprising
   a housing defining an interior cavity and having an annular opening in the side thereof to permit flow of oil into said cavity, and
   a generally annular screen coated with a hydrophobic material mounted at said opening to permit oil but not water to flow therethrough into said cavity, that improvement wherein
   a watertight seal between coated end portions of said coated screen is provided by overlapping said coated end portions in face-to-face engagement without adhesive or other connecting means contacting said coating material;
   a control mounted within said housing includes a buoyant element movable between first and second configurations and arranged to actuate a pump when said element is in said second configuration and to deactuate said pump when said element is in said first configuration, and means for preventing movement of said element from said first position to said second position unless said cavity is filled with oil to a depth substantially in excess of that required buoyantly to support said element and for preventing movement of said element from said second position to said first position unless said cavity is substantially empty of oil, said element including a float mounted within said cavity for movement in a generally vertical direction between said first configuration wherein said float engages the bottom of said cavity and said second configuration wherein said float is spaced from said bottom;

a magnet is mounted in one of said cavity bottom and said float and an element of soft magnetic material is mounted in the other of said cavity bottom and said float, said magnet and said element being positioned to be closely adjacent each other when said float is in said first configuration; and a conduit is adapted for connection to a fluid source and has an orifice therein positioned relative to said float such that said float overlies said orifice when said float is in one of said configurations and is spaced from said orifice when said float is in the other of said configurations.

* * * * *